Patented Sept. 18, 1951

2,568,154

UNITED STATES PATENT OFFICE 2,568,154

CRYSTALLIZATION OF SODIUM NAPHTHALENE BETA SULFONATES

Alfred Garrett Hill, Martinsville, and Shirley I. Gale, Plainfield, N. J., assignors to American Cyanamid Company, New York, N. Y., a corporation of Maine No Drawing. Application December 3, 1946, Serial No. 713,832

10 Claims. (Cl. 260—505)

This invention relates to a process for reducing the amount of super-saturation of crude aqueous solutions of sodium naphthalene beta-sulfonate.

Sodium naphthalene beta sulfonate is manufactured on a large scale for the production of beta-naphthol. The commercial process comprises sulfonating naphthalene under controlled conditions, steam-treating the melt to hydrolyze naphthalene alpha-sulfonic acid and to remove excess naphthalene, neutralizing the acid, and crystallizing out the sodium naphthalene beta-sulfonate. When this process is operated to give optimum crystal size, a very serious operating difficulty is encountered due to the tendency of the sodium naphthalene beta sulfonate to crystallize incompletely from the aqueous solution. The aqueous mother liquor will contain more of this sulfonate than normally required for saturation of an aqueous solution containing the same amount of inorganic salts at a particular temperature.

Various attempts have been made to recover the sodium naphthalene beta-sulfonate from such supersaturated solutions. However, conditions necessary for the release of the supersaturation have been very obscure. The results using various combinations of well-known procedures, such as seeding, changing the temperature and agitation, have been found to be unsatisfactory. Extensive seeding methods present practical difficulties on a plant scale. Vigorous agitation is practical in plant operation but the time necessary to initiate the formation of crystals is far too long. Violent agitation with a homogenizer releases the supersaturation more quickly, but produces finely dispersed crystals which settle very poorly. Results by any of these methods are inconsistent and erratic. Some samples will slowly reduce their supersaturation on standing at room temperature without special treatment. Others resist release for several days. Still others do not respond to any of these treatments. Therefore, even though the supersaturation may be reduced to some extent in the course of time, the amount of time required and the extent of the release achieved is unpredictable. This behavior presents great practical difficulties on a plant scale. When the process is conducted without release of supersaturation, very considerable losses are involved, particularly in large scale production.

It is an object of the present invention to bring about more complete precipitation from crude supersaturated aqueous solutions of sodium naphthalene beta-sulfonate, thereby reducing material losses. It is an advantage of this invention that it usually operates to reduce the time necessary for crystallizing the sodium naphthalene beta-sulfonate from such supersaturated solutions, while still effecting a more complete reduction of the supersaturation. A further advantage of the invention is that under optimum operating conditions the sodium naphthalene beta-sulfonate is obtained from its supersaturated solutions in coarse crystalline form which can be easily recovered.

We have discovered that these desirable results are readily obtained by the addition of a surface-active agent to the supersaturated solution of the sodium naphthalene beta-sulphonate, the latter being preferably previously clarified. The surface-active agent will almost immediately initiate the crystallization. Cooling and agitation are then effective mechanical aids in completing the release of the supersaturation in such solutions. The supersaturation values of such solutions may, for example, be reduced from the usual value of about 1.5 g./100 cc. to less than 0.2 g./100 cc. with comparatively short periods of stirring after the addition of the surface-active agent. The problem of crystallization from the super-saturated solution is thus solved by an effective control. The inconsistent behavior of the supersaturated solution disappears, and, in experiments where the temperature and agitation are suitably regulated, results can be predicted with reasonably certainty.

These results are particularly surprising in view of the prior art. Previous experience would indicated that the addition of a foreign material, and particularly a high molecular weight organic substance, to an aqueous solution would impede the crystallization of salts from it. Contrary to the results which would be anticipated from such teachings, the addition of a surface-active agent actually initiates the crystallization of the sodium naphthalene beta-sulfonate from such solutions, and also assists in completing the precipitation once it has started.

While we do not wish to be limited to any theory of action, it appears that one possible explanation for this phenomenon is that the excess sodium naphthalene beta-sulfonate is held in the aqueous solution by the presence of very small amounts of certain organic impurities, the solubility of which is in turn greater in the sulfonate solution than in water. The addition of a surface-active agent to such a solution may then act to make ineffective these impurities which interfere with crystallization. Previous attempts to counteract this supersaturation using various combinations of other important factors, such as seeding, changing the temperature, and agitation, were therefore only partially successful. The organic impurities are apparently sufficiently soluble in the sulfonate solution that clarification alone does not remove them completely.

In the attempt to determine how much of the surface-active agent is required, the surprising effect of even minute amounts was soon discovered. Immediate success attended trials using only very small quantities. A concentration of only 0.01 g. of one of the more active materials per 100 cc. of supersaturated solution is generally successful in bringing about substantially complete elimination of supersaturation. It is, therefore, an advantage of the invention that the amounts of surface active agents are not critical, it being necessary only to add minute amounts, although larger amounts than stated above are equally effective, but not recommended in the interest of economy.

Larger amounts of the surface-active agents are required when the solution has been incompletely clarified. The impurities normally present have a slight solubility in the aqueous salt solution, but the greater amount appears to be in a state of fine suspension with the sodium naphthalene beta-sulfonate. The amount of the impurities present varies considerably, depending on the opportunity the impurities have had to settle out. Very cloudy solutions contain such large amounts of these impurities that no treatment is recommended until the solution has been clarified by settling or by filtration. If settling is not complete and the solution is murky, the supersaturation will not be reduced easily or completely. The impurities not only interfere with the formation of crystals, but also with the growth of the crystals which have been started. A clear solution releases its supersaturation more readily and produces better crystals. Having a clear solution, the extent of the reduction of supersaturation depends on the manner in which the crystals are shocked out. There is considered to be an optimum formation rate of new nuclei which will give both low supersaturation values and crystals that will settle well on standing.

The present invention is not limited to a particular surface-active agent, and it is an advantage that a wide choice is presented. When a large number of surface-active substances were systematically tested, a degree of positive results were obtained with all of them. Surface-active agents of all types, namely, cationic, anionic and non-ionic have been found suitable. Surface-active materials which have been found to be particularly effective in bringing about a release in supersaturation from sodium naphthalene beta-sulfonate solutions are the dialkyl sulfosuccinates, particularly those in which the alkyl group has at least six carbon atoms. A somewhat similar compound which is also suitable is the di-(beta-hydroxy-ethyl)-N-octadecyl aspartamide acetate. Another type of surface-active agent which is especially satisfactory is the alkyl naphthalene sulfonates, for example, isopropyl-naphthalene sodium sulfonate.

Other types of surface-active agents which are suitable are the long chain alkyl alcohol sulfates, N-long chain acyl N-methyl taurines such as N-oleyl-N-methyl taurine, long chain fatty acid esters of sodium isethionate, condensation products of long chain acyl guanidines with ethylene oxide such as the condensation product of octadecyl guanidine with 6 moles of ethylene oxide.

According to our invention, the mother liquor resulting from the separation of the bulk of the sodium naphthalene beta-sulfonate is preferably first clarified, suitably by settling or by filtration, to remove insoluble substances. The appropriate amount of the surface-active agent is then added and the solution is agitated. Best results are usually obtained with a high speed of stirring, since increasing the agitation at any given temperature definitely favors the deposition of the sodium naphthalene beta-sulfonate. Some cooling is desirable, even with good agitation. The operation is very satisfactory at temperatures of 25°–35° C., but somewhat better results are obtained at still lower temperatures. Preferably, the drop in temperature is 5° C. or more. The crystalline product can be easily recovered by means of settling or filtration.

The following examples are illustrative of our invention. The supersaturated solution of sodium naphthalene beta-sulfonate used in each of the examples is the mother liquor which results after separating the bulk of the sodium naphthalene beta sulfonate. This mother liquor is obtained from crystallization of the sodium naphthalene beta-sulfonate solution produced by sulfonating naphthalene under controlled conditions, steam-treating the melt to hydrolyze any naphthalene alpha-sulfonic acid and to remove excess naphthalene, and then neutralizing the acid. This mother liquor usually also contains about 12–14% of inorganic salts, largely sodium sulfate, less than one percent of sodium naphthalene alpha-sulfonate, and 3–5% of sodium naphthalene disulfonate, together with small amounts of certain organic impurities.

*Example 1*

The settled mother liquor resulting from the separation of the bulk of the sodium naphthalene beta sulfonate, and containing approximately 1.7 g./100 cc. of sodium naphthalene beta sulfonate above the true solubility at 35° C., was stirred with 0.01 g./100 cc. of dihexyl sodium sulfosuccinate. Agitation was adjusted to a rate sufficient to effect a substantially complete reduction in supersaturation in 30 minutes. At this time, considerable sulfonate had precipitated from the solution and analysis of the mother liquor showed that the supersaturation had been reduced to 0.2 gram per 100 cc. The recovery of sodium naphthalene beta sulfonate was therefore 1.5 g./100 cc. In a parallel experiment, where no surface-active material was added, precipitation had not occurred after 6 hours, even though identical conditions of size of batch, initial supersaturation and agitation were employed.

*Example 2*

To the settled mother liquor resulting from the separation of the bulk of the sodium naphthalene beta sulfonate, and containing 1.3 g./100 cc. of sodium naphthalene beta sulfonate above the true solubility at 35° C., was added 0.01 g./100 cc. of dioctyl sodium sulfosuccinate. The mixture was cooled externally from 35° to 30° C. under vigorous agitation for 10 minutes. Sodium naphthalene beta sulfonate was precipitated and the mother liquor was found to contain only 0.1 g./100 cc. of the sulfonate above true solubility. In a control experiment where no surface-active agent was added, there was no change in supersaturation in 30 minutes after the solution was cooled 5° C.; other conditions such as size of batch, initial supersaturation, and agitation being the same.

*Example 3*

To the settled mother liquor resulting from the separation of the bulk of the sodium naphthalene beta sulfonate, and containing approximately 1.35 g./100 cc. of sodium napthalene beta sulfonate above the true solubility at 35° C., was added 0.01 g./100 cc. of dioctyl sodium sulfosuccinate. The mixture was cooled internally by application of vacuum from 35° to 25° C. within 20 minutes, and was stirred for 5 minutes more with vigorous agitation. After precipitation, the mother liquor contained only 0.01 g./100 cc. of the sulfonate as a supersaturated solution. In a control experiment where no surface-active agent was added, there was some precipitation of sodium beta naphthalene sulfonate, but after 15 minutes there still remained 1.1 g./100 cc. in solution above true solubility. In the control experiment all other factors, such as agitation, initial supersaturation, cooling, and size of bath were equal to those employed in the above test.

*Example 4*

The settled mother liquor resulting from the separation of the bulk of the sodium naphthalene beta sulfonate, and containing approximately 1.50 g./100 cc. of sodium naphthalene beta sulfonate above the true solubility at room temperature, was stirred for 30 minutes with 0.01 g./100 cc. of "Nacconal NR" flakes. (The exact chemical composition of "Nacconal NR" is not disclosed by the manufacturer but the product is reputed to be an alkyl naphthalene sulfonate.) Analysis of the mother liquor showed that the supersaturation had been reduced to 0.10 g./100 cc.

*Example 5*

The settled mother liquor resulting from the separation of the bulk of the sodium naphthalene beta sulfonate, and containing approximately 1.50 g./100 cc. of sodium naphthalene beta sulfonate above the true solubility at room temperature, was stirred for 30 minutes with 0.01 g./100 cc. of a commercial cationic agent which is the carbonate salt of the reaction product of octadecylguanidine with six moles of ethylene oxide. Analysis of the mother liquor showed that the supersaturation had been reduced to 0.19 g./100 cc.

As shown in the above illustrative examples, crystalline sodium naphthalene beta-sulfonate is readily recovered from supersaturated aqueous solutions of the same, by the present invention wherein the supersaturation is released by incorporating minor amounts of surface-active agents in said aqueous solutions. Likewise, as shown in said illustrative examples, surface active agents of all types are effective in releasing the supersaturation of aqueous solutions of sodium naphthalene beta-sulfonate when incorporated in minor amounts in said solutions; even in very small amounts as shown in said examples wherein typical surface-active agents are employed in illustrating our invention. That is, the above examples are merely illustrative of our new and improved methods of recovering crystalline sodium naphthalene beta-sulfonate from supersaturated aqueous solutions of the same and various other surface-active agents may be employed in the commercial practice thereof, such as the various cationic, anionic and non-ionic surface active agents disclosed ante in this specification. In other words, as there disclosed and described, the term "surface-active agent" is employed in its generic and customary meaning and includes cationic, anionic and non-ionic surface-active agents; typical illustrative examples of each of these types of surface-active agents being disclosed ante. As a class, such surface-active agents are well known in the commercial art and have as the main, common characteristic thereof, the power to modify the respective surface relationship between liquid-vapor, liquid-solid and liquid-liquid systems; they being effective at very low concentrations and essentially at the interfacial layers themselves. Generically, surface-active agents are organic polar compounds which exhibit definite orientation in said systems and tend to concentrate at the interfacial layers thereof due to the polarity of such agents; hence their ability to modify the surface relationship in said systems and their effectiveness at very low concentrations.

What we claim is:

1. As a new and improved method of recovering crystalline sodium naphthalene beta-sulfonate from supersaturated aqueous solutions of the same, the improved method which comprises incorporating a minor proportion of a surface-active agent in said solution, agitating the mixture until a substantial amount of sodium naphthalene beta-sulfonate has crystallized therefrom and recovering the crystalline sodium naphthalene beta-sulfonate so obtained, said surface-active agent being an ionic surface-active agent selected from the class consisting of cationic surface-active agents and anionic surface-active agents.

2. The process of claim 1 wherein said surface-active agent is a cationic surface-active agent.

3. The process of claim 1 wherein said surface-active agent is an anionic surface-active agent.

4. The process of claim 1 in which the surface-active agent is an alkyl naphthalene sulfonate.

5. The process of claim 1 in which the surface-active agent is a condensation product of octadecyl guanidine with 6 mols of ethylene oxide.

6. As a new and improve method of recovering crystalline sodium naphthalene beta-sulfonate from supersaturated aqueous solutions of the same, the improved method which comprises incorporating a minor proportion of a dialkyl succinate having at least 6 carbon atoms in each alkyl group in said solution, agitating the mixture until a substantial amount of sodium naphthalene beta-sulfonate has crystallized therefrom and recovering the crystalline sodium naphthalene beta-sulfonate so obtained.

7. The process of claim 6 wherein said dialkyl sulfosuccinate is a dioctyl succinate.

8. The process of claim 1 wherein said supersaturated aqueous solution of sodium naphthalene beta-sulfonate is a supersaturated aqueous solution of same resulting from the manufacture of sodium naphthalene beta-sulfonate by the sulfonation of naphthalene.

9. The process of claim 6 wherein said supersaturated aqueous solution of sodium naphthalene beta-sulfonate contains a water soluble inorganic salt dissolved therein.

10. The process of claim 1 wherein said supersaturated aqueous solution of naphthalene beta-sulfonate containing sodium sulfate dissolved therein.

ALFRED GARRETT HILL.
SHIRLEY I. GALE.

REFERENCES CITED

The following references are of record in the file of this patent:

UNITED STATES PATENTS

| Number | Name | Date |
|---|---|---|
| 2,139,277 | Lenher et al. | Dec. 6, 1938 |

OTHER REFERENCES

Campbell et al.: Trans. Faraday Soc., V, 33 (1937).

Ind. Eng. Chem., vol. 38, pages 18–19 (1946).